(12) United States Patent
Kim et al.

(10) Patent No.: US 9,509,461 B2
(45) Date of Patent: Nov. 29, 2016

(54) METHOD AND APPARATUS FOR TRANSMITTING AND RECEIVING SIGNALS IN WIRELESS COMMUNICATION SYSTEM

(71) Applicant: LG ELECTRONICS INC., Seoul (KR)

(72) Inventors: Kijun Kim, Anyang-si (KR); Jonghyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 14/378,625

(22) PCT Filed: Feb. 20, 2013

(86) PCT No.: PCT/KR2013/001324
§ 371 (c)(1),
(2) Date: Aug. 13, 2014

(87) PCT Pub. No.: WO2013/125841
PCT Pub. Date: Aug. 29, 2013

(65) Prior Publication Data
US 2015/0023275 A1      Jan. 22, 2015

Related U.S. Application Data

(60) Provisional application No. 61/600,998, filed on Feb. 20, 2012.

(51) Int. Cl.
| H04L 5/00 | (2006.01) |
| H04W 56/00 | (2009.01) |
| H04J 11/00 | (2006.01) |
| H04B 7/02 | (2006.01) |

(52) U.S. Cl.
CPC .......... *H04L 5/0035* (2013.01); *H04J 11/0053* (2013.01); *H04W 56/0045* (2013.01); *H04B 7/024* (2013.01)

(58) Field of Classification Search
CPC ............... H04L 5/0035; H04L 1/0038; H04L 25/03866; H04J 11/0053; H04W 56/0045; H04W 72/042; H04W 72/044
See application file for complete search history.

(56) References Cited

U.S. PATENT DOCUMENTS

2009/0254676 A1* 10/2009 Joo .................... H04L 12/4625
                                                                     709/236
2011/0164607 A1    7/2011 Farmer
(Continued)

FOREIGN PATENT DOCUMENTS

| WO | 2010/125155 | 11/2010 |
| WO | 2010/134792 | 11/2010 |

OTHER PUBLICATIONS

LG Electronics, "Uplink Control Signals for CoMP," 3GPP TSG RAN WG1 Meeting #66bis, R1-113282, Oct. 2011, 2 pages.
(Continued)

*Primary Examiner* — Anez Ebrahim
(74) *Attorney, Agent, or Firm* — Lee, Hong, Degerman, Kang & Waimey

(57) ABSTRACT

A method for transmitting, at a user equipment, an uplink signal to a transmission point performing cooperative transmission in a wireless communication system according to an embodiment of the present invention includes generating the uplink signal based on a virtual cell identifier and virtual timing information, wherein the virtual cell identifier and virtual timing information are independently configured according to transmission channels.

14 Claims, 11 Drawing Sheets

(56) References Cited

U.S. PATENT DOCUMENTS

2011/0287777 A1   11/2011  Yu
2012/0082098 A1*  4/2012  Oprescu-Surcobe ... H04L 65/00
                                                                   370/329
2013/0170449 A1*  7/2013  Chen .................... H04L 1/0038
                                                                   370/329

OTHER PUBLICATIONS

PCT International Application No. PCT/KR2013/001324, Written Opinion of the International Searching Authority dated Jun. 20, 2013, 1 page.

* cited by examiner (a)

(b)

MeNB : macro eNodeB
PeNB : pico eNodeB
FeNB : femto eNodeB

MUE : macro UE
PUE : pico UE
FUE : femto eNodeB

METHOD AND APPARATUS FOR TRANSMITTING AND RECEIVING SIGNALS IN WIRELESS COMMUNICATION SYSTEM

CROSS-REFERENCE TO RELATED APPLICATIONS

This application is the National Stage filing under 35 U.S.C. 371 of International Application No. PCT/KR2013/001324, filed on Feb. 20, 2013, which claims the benefit of U.S. Provisional Application Ser. No. 61/600,998, filed on Feb. 20, 2012, the contents of which are all hereby incorporated by reference herein in their entirety.

TECHNICAL FIELD

The present invention relates to a wireless communication system, and more particularly, to a method and apparatus for transmitting and receiving signals in Coordinated Multi-Point (CoMP).

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

Technical Problem

An object of the present invention devised to solve the problem lies in providing smooth coordinated transmission when frame timings of transmission points are different in a CoMP environment.

It will be appreciated by persons skilled in the art that that the technical objects that can be achieved through the present invention are not limited to what has been particularly described hereinabove and other technical objects of the present invention will be more clearly understood from the following detailed description.

Technical Solution

In a first technical aspect of the present invention, a method for transmitting, at a user equipment, an uplink signal to a transmission point performing cooperative transmission in a wireless communication system includes generating the uplink signal based on a virtual cell identifier and virtual timing information, wherein the virtual cell identifier and virtual timing information are independently configured according to transmission channels.

In a second technical aspect of the present invention, a method for receiving, at a user equipment, a downlink signal from a transmission point performing cooperative transmission in a wireless communication system includes decoding the received downlink signal based on a virtual cell identifier and virtual timing information, wherein the virtual cell identifier and virtual timing information are independently configured according to transmission channels.

In a third technical aspect of the present invention, a user equipment for transmitting an uplink signal to a transmission point performing cooperative transmission in a wireless communication system includes a transmission module and a processor, wherein the processor generates the uplink signal based on a virtual cell identifier and virtual timing information which are independently configured according to transmission channels.

In a fourth technical aspect of the present invention, a user equipment for receiving a downlink signal from a transmission point performing cooperative transmission in a wireless communication system includes a reception module and a processor, wherein the processor decodes the received downlink signal based on a virtual cell identifier and virtual timing information which are independently configured according to transmission channels.

In a fifth technical aspect of the present invention, a method for receiving, at a user equipment, a downlink signal from a transmission point performing cooperative transmission in a wireless communication system includes demodulating a demodulation reference signal of the received downlink signal based on a virtual cell identifier and virtual timing information and decoding downlink data related to the demodulation reference signal based on a cell identifier and time resource information, wherein the virtual cell identifier and virtual timing information are independently configured according to transmission channels.

The above first to fifth technical aspects of the present invention may include the followings all or partially.

The virtual timing information may be a virtual frame timing configured independently according to the transmission channels.

The virtual frame timing may be a slot offset between a reference frame timing of the transmission point and the virtual frame timing.

At least one transmission point performing cooperative transmission with the transmission point may have a different frame timing from a frame timing of the transmission point.

The transmission channels may include an uplink channel and a downlink channel.

The transmission channels may include a Channel State Information-Reference Signal (CSI-RS), a Physical Downlink Shared CHannel (PDSCH), a Physical Downlink Control CHannel (PDCCH), an Enhanced PDCCH (EPDCCH), a Physical uplink shared CHannel (PUSCH), a Physical Uplink Control CHannel (PUCCH), and a Sounding Reference Signal (SRS).

Advantageous Effects

According to the present invention, cooperative transmission can be smoothly performed even when frame timings of transmission points differ in a CoMP environment. In addition, CoMP can be efficiently performed by configuring a virtual frame timing for each channel.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
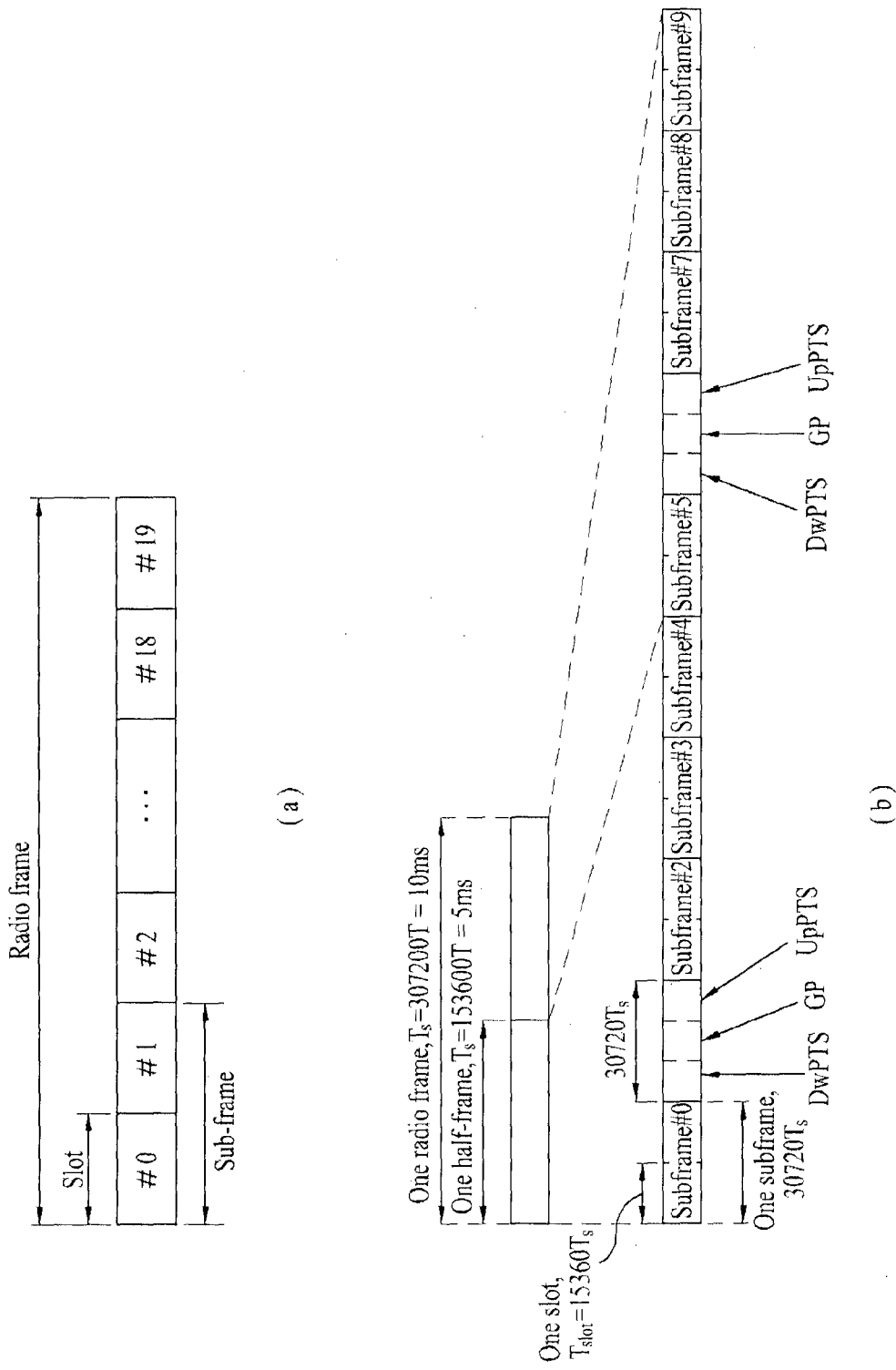
FIG. 1 is a view illustrating the structure of a radio frame.

The embodiments of the present invention described below are combinations of elements and features of the present invention in a predetermined form. The elements or features are considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions or features of another embodiment.

In this specification, a description of embodiments of the present invention is given based on a data transmission and reception relationship between a BS and a terminal. Here, the BS refers to a terminal node of a network, which directly communicates with the terminal. In some cases, a specific operation described as being performed by the BS may be performed by an upper node of the BS.

Namely, it is apparent that, in a network comprised of a plurality of network nodes including a BS, various operations performed for communication with a terminal may be performed by the BS, or network nodes other than the BS. The term 'BS' may be replaced with terms such as fixed station, Node B, eNode B (eNB), Access Point (AP), etc. The term 'relay' may be replaced with terms such as Relay Node (RN), Relay Station (RS), etc. The term 'terminal' may be replaced with the term such as User Equipment (UE), Mobile Station (MS), Mobile Subscriber Station (MSS), Subscriber Station (SS), etc.

Specific terms used for the embodiments of the present invention are provided to aid in the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed in at least one of wireless access systems including an Institute of Electrical and Electronic Engineers (IEEE) 802 system, a 3rd Generation Partnership Project (3GPP) system, a 3GPP LTE system, an LTE-Advanced (LTE-A) system, and a 3GPP2 system. Steps or parts that are not described to clarify the technical features of the present invention can be supported by those documents. In addition, all terms as set forth herein can be explained by the above standard documents.

The following techniques may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as radio technology such as Universal Terrestrial Radio Access (UTRA) or CDMA2000. TDMA may be implemented as radio technology such as Global System for Mobile communications (GSM)/General Packet Radio Service (GPRS)/Enhanced Data Rates for GSM Evolution (EDGE). OFDMA may be implemented as radio technology such as IEEE 802.11 (Wi-Fi), IEEE 802.16 (WiMAX), IEEE 802.20, Evolved-UTRA (E-UTRA), etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolved version of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this disclosure focuses on the 3GPP LTE and 3GPP LTE-A systems. However, the technical features of the present invention are not limited thereto.

The structure of a radio frame will now be described with reference to FIG. 1.

In a cellular Orthogonal Frequency Division Multiplexing (OFDM) wireless packet communication system, uplink and/or downlink data packets are transmitted in units of subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(*a*) illustrates the type-1 radio frame structure. A downlink radio frame is divided into 10 subframes each including two slots in the time domain. A time during which one subframe is transmitted is defined as a Transmission Time Interval (TTI). For example, the length of one subframe may be 1 ms and the length of one slot may be 0.5 ms. One slot includes a plurality of OFDM symbols in the time domain and a plurality of Resource Blocks (RBs) in the frequency domain. Because the 3GPP LTE system adopts OFDMA for downlink, an OFDM symbol represents one symbol duration. An OFDM symbol may be referred to as an SC-FDMA symbol or symbol duration. An RB is a resource allocation unit and may include a plurality of contiguous subcarriers in a slot.

The number of OFDM symbols included in one slot may vary according to a Cyclic Prefix (CP) configuration. There are two types of CPs: extended CP and normal CP. In the case of the normal CP, the number of OFDM symbols included in one slot may be 7. In the case of the extended CP, the length of one OFDM symbol is increased and thus the number of OFDM symbols included in one slot may be, for example, 6, which is smaller than in the case of the normal CP. If a channel state is unstable as in the case where a UE moves fast, the extended CP may be used to further decrease interference between symbols.

In the case of the normal CP, one subframe includes 14 OFDM symbols because one slot includes 7 OFDM symbols. The first two or three OFDM symbols of each subframe may be allocated to a Physical Downlink Control Channel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation in a UE. The UpPTS is used for channel estimation and uplink transmission synchronization acquisition of a UE in an eNB. The GP is a period between uplink and downlink, which eliminates uplink interference caused by multipath delay of a downlink signal. One subframe includes two slots irrespective of the type of a radio frame.

The above-described radio frame structures are purely exemplary and thus the number of subframes in a radio frame, the number of slots in a subframe, or the number of symbols in a slot may vary.

Figure 2:
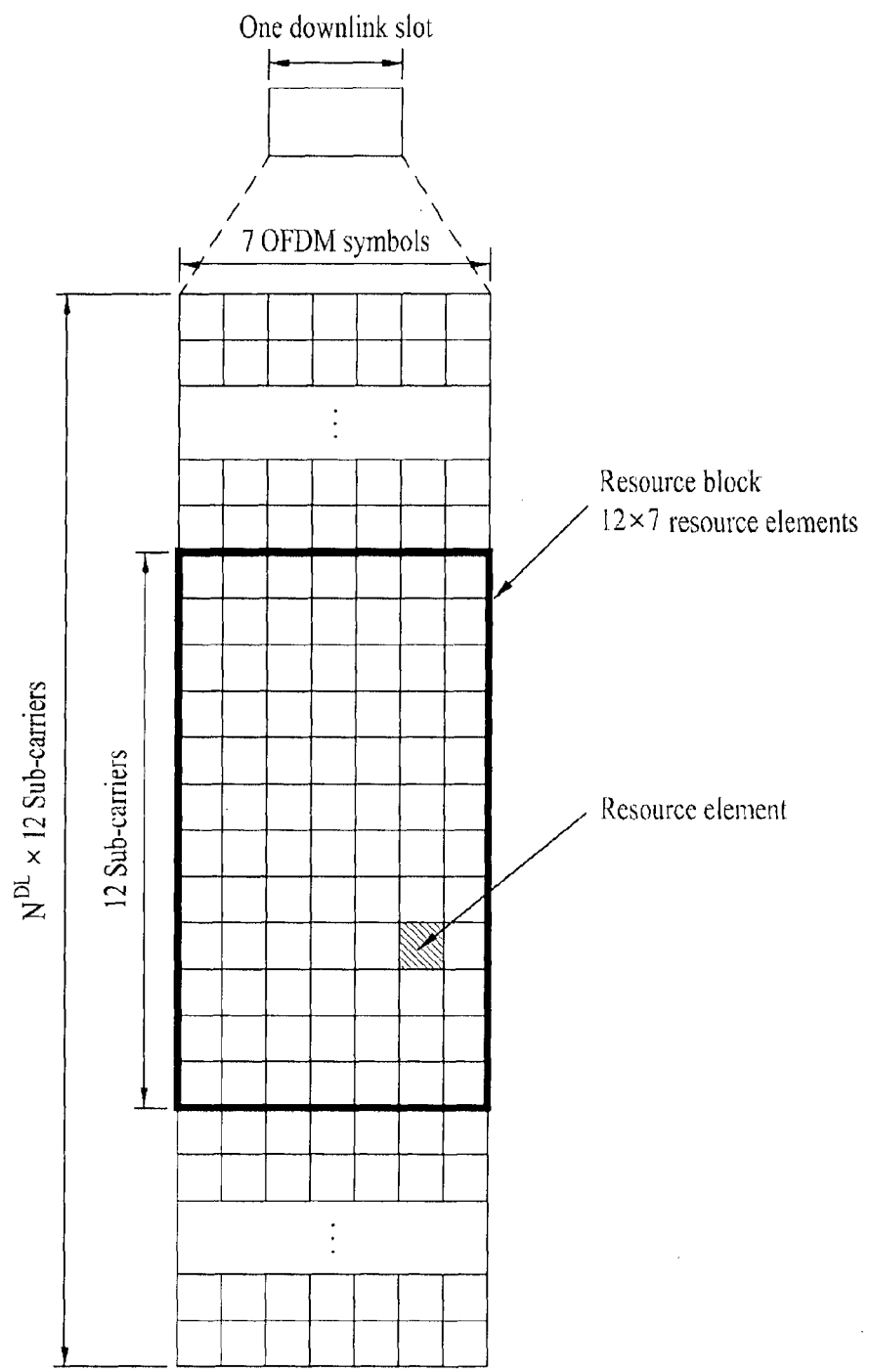
FIG. 2 is a view illustrating a resource grid in a downlink slot.

FIG. 2 illustrates a resource grid in a downlink slot. One downlink slot includes 7 OFDM symbols in the time domain and an RB includes 12 subcarriers in the frequency domain. However, the present invention is not limited thereto. For example, one slot may include 7 OFDM symbols in the case of the normal CP and 6 OFDM symbols in the case of the extended CP. Each element of the resource grid is referred to as a Resource Element (RE). An RB includes 12×7 REs. The number of RBs in a downlink slot, $N^{DL}$, depends on downlink transmission bandwidth. An uplink slot may have the same structure as a downlink slot.

Figure 3:
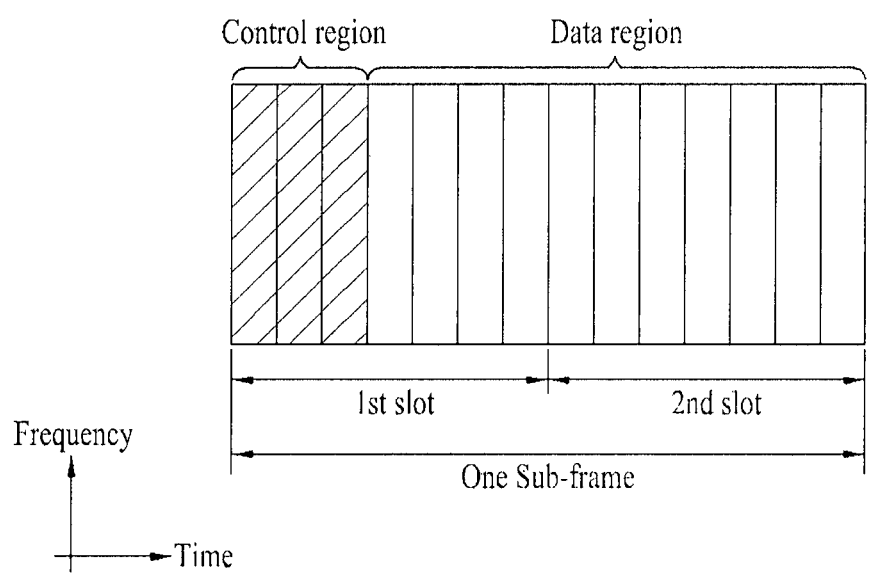
FIG. 3 is a view illustrating the structure of a downlink subframe.

FIG. 3 illustrates the structure of a downlink subframe. A maximum of three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include, for example, a Physical Control Format Indicator Channel (PCFICH), a Physical Downlink Control Channel (PDCCH), and a Physical Hybrid automatic repeat request (HARQ) Indicator Channel (PHICH). The PCFICH is transmitted in the first OFDM symbol of a subframe and includes information about the number of OFDM symbols used for transmission of control channels in the subframe. The PHICH includes HARQ ACKnowledgment/Negative ACKnowledgment (ACK/NACK) signal as a response to uplink transmission. Control information transmitted through the PDCCH is called Downlink Control Information (DCI). The DCI includes uplink or downlink scheduling information, or uplink transmission power control commands for a certain UE group. The PDCCH may include information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a random access response transmitted on the PDSCH, a set of transmit power control commands for individual UEs of a UE group, transmit power control information, Voice Over Internet Protocol (VoIP) activation information, etc. A plurality of PDCCHs may be transmitted in the control region. A UE may monitor a plurality of PDCCHs. A PDCCH is transmitted as an aggregate of one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an identifier known as a Radio Network Temporary Identifier (RNTI) according to the owner or usage of the PDCCH. If the PDCCH is dedicated to a specific UE, a cell-RNTI (C-RNTI) of the UE may be masked to the CRC. If the PDCCH is dedicated to a paging message, a paging identifier (paging-RNTI (P-RNTI)) may be masked to the CRC. If the PDCCH is for system information (especially, a System Information Block (SIB)), a system information identifier and a System Information RNTI (SI-RNTI) may be masked to the CRC. A Random Access RNTI (RA-RNTI) may be masked to the CRC in order to indicate a random access response to a random access preamble transmitted by a UE.

Figure 4:
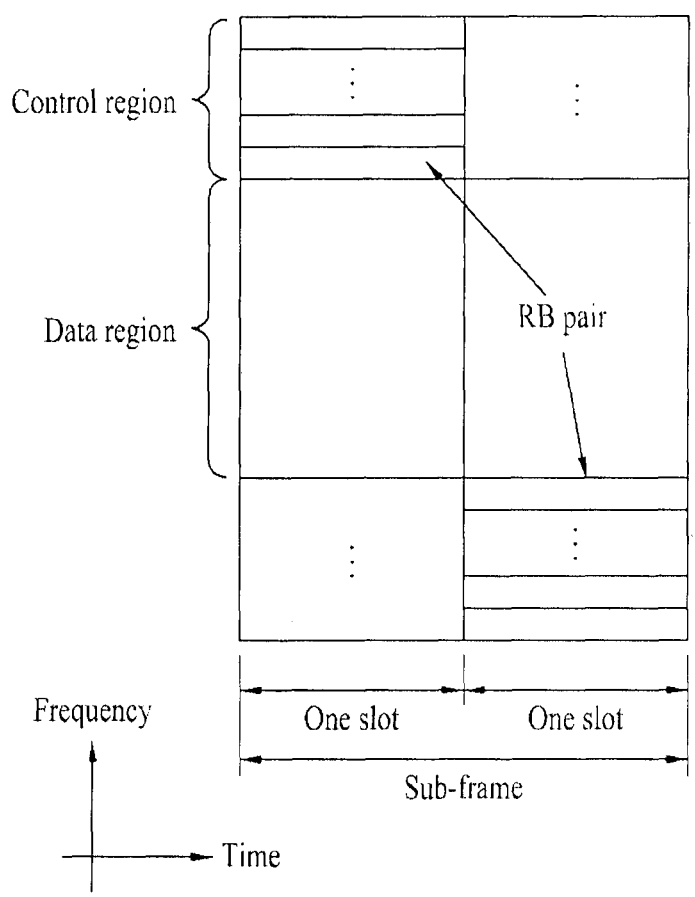
FIG. 4 is a view illustrating the structure of an uplink subframe.

FIG. 4 illustrates the structure of an uplink subframe. An uplink subframe may be divided into a control region and a data region in the frequency domain. A Physical Uplink Control Channel (PUCCH) including uplink control information is allocated to the control region and a Physical Uplink Shared Channel (PUSCH) including user data is allocated to the data region. To maintain a single carrier property, a UE does not transmit a PUSCH and a PUCCH simultaneously. A PUCCH for a UE is allocated to an RB pair in a subframe. The RBs belonging to the RB pair occupy different subcarriers in two slots. Thus it is said that the RB pair allocated to the PUCCH is frequency-hopped over a slot boundary.

Reference Signal (RS)

In a wireless communication system, a packet is transmitted through a radio channel and thus the packet may be distorted during transmission. To receive a signal successfully, a receiver should compensate for the distortion of the received signal using channel information. To obtain the channel information, a transmitter transmits a signal known to both the transmitter the receiver and the receiver acquires the channel information based on the distortion of the signal received through the radio channel. This signal is called a pilot signal or an RS.

In the case of data transmission and reception using multiple antennas, a channel states between transmit antennas and receive antennas should be discerned in order to correctly receive a signal. Accordingly, an RS should be transmitted through each transmit antenna, in more detail, each antenna port.

RSs may be divided into downlink RSs and uplink RSs. In the current LTE system, the uplink RSs include:

i) DeModulation Reference Signal (DMRS) used for channel estimation for coherent demodulation of information transmitted through a PUSCH and a PUCCH; and ii) Sounding Reference Signal (SRS) used for an eNB or a network to measure the quality of an uplink channel in a different frequency.

The downlink RSs include:

i) Cell-specific Reference Signal (CRS) shared among all UEs in a cell;

ii) UE-specific RS dedicated to a specific UE;

iii) DM-RS used for coherent demodulation when a PDSCH is transmitted;

iv) Channel State Information-Reference Signal (CSI-RS) used for transmitting CSI, when downlink DM-RSs are transmitted;

v) Multimedia Broadcast Single Frequency Network (MBSFN) RS used for coherent demodulation of a signal transmitted in MBSFN mode; and vi) Positioning RS used to estimate geographical position information of a UE.

RSs may be divided into two types according to purposes thereof: RSs for channel information acquisition and RSs for data demodulation. Since the purpose of the former is to cause the UE to acquire downlink channel information, the RSs for channel information acquisition should be transmitted in a broad band and a UE that does not receive downlink data in a specific subframe should receive the RSs. The RSs for channel information acquisition are also used in a situation such as handover. The latter is RSs that are transmitted by an eNB to a corresponding resource together with downlink data. A UE can demodulate the data by measuring a channel using the RSs for data demodulation. The RSs for data demodulation should be transmitted in a data transmission area.

The CRS is used for two purposes, that is, channel information acquisition and data demodulation. The UE-specific RS is used only for data demodulation. The CRS is transmitted in every subframe in a broad band and CRSs for up to four antenna ports are transmitted according to the number of transmit antennas of an eNB.

For example, if the number of transmit antennas of an eNB is 2, CRSs for antenna ports 0 and 1 are transmitted. In the case of four transmit antennas, CRSs for antenna ports 0 to 3 are respectively transmitted.

Figure 5:
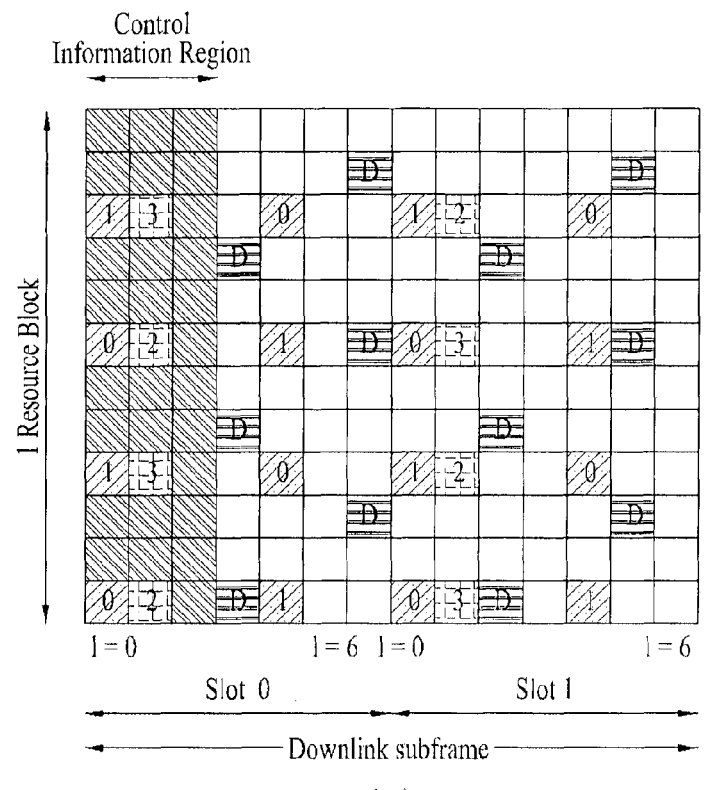
FIG. 5 is a view referred to for describing reference signals.
Figure 5:
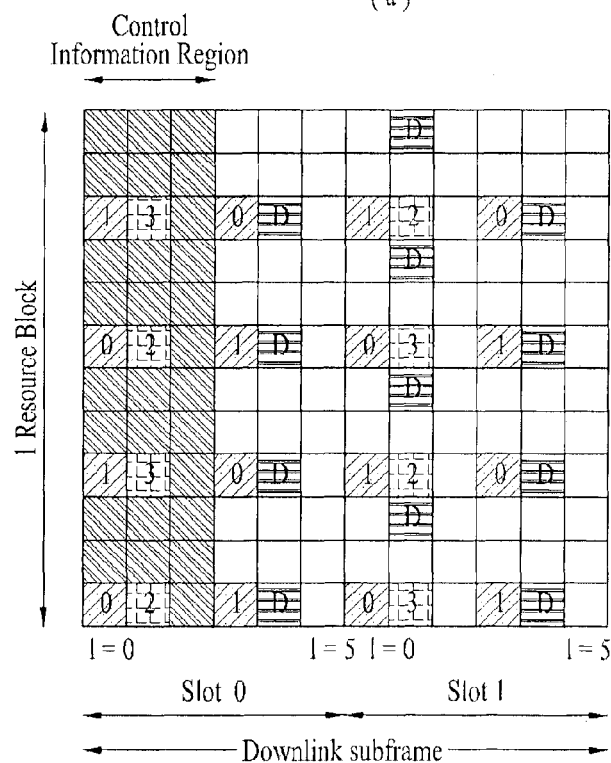

FIG. 5 illustrates patterns in which CRSs and DRSs are mapped to a downlink RB pair, as defined in a legacy 3GPP LTE system (e.g. a Release-8 system). A downlink RB pair as an RS mapping unit may be expressed as one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

FIG. 5 illustrates the positions of RSs on an RB pair in a system where an eNB supports four transmit antennas. In FIG. 5, REs expressed by reference numerals '0', '1', '2', and '3' illustrates the positions of CRSs for antenna ports 0, 1, 2, and 3, respectively, and REs expressed by 'D' denote the positions of DRSs.

Coordinated Multi-Point (CoMP)

According to enhanced system performance requirements for the 3GPP LTE-A system, CoMP transmission and reception technology (expressed also by co-MIMO, collaborative MIMO, or network MIMO) has been proposed. The CoMP technology can increase the performance of a UE located at a cell edge and increase average sector throughput.

Generally, the performance of a UE located at a cell edge and average sector throughput may be decreased due to Inter-Cell Interference (ICI) in a multi-cellular environment with a frequency reuse factor of 1. To reduce ICI, the legacy LTE system has adopted a simple passive technique such as Fractional Frequency Reuse (FFR) based on UE-specific power control so that a UE located at a cell edge may have appropriate throughput performance in an environment constrained by interference. However, it is desirable to reduce ICI or reuse ICI as a desired signal for the UE, rather than to decrease the utilization of frequency resources per cell. For this purpose, a CoMP transmission technique may be adopted.

Downlink CoMP schemes are classified largely into Joint Processing (JP), and Coordinated Scheduling/Beamforming (CS/CB).

According to the JP scheme, each transmission point (eNB) of a CoMP cooperation unit may use data. The CoMP cooperation unit refers to a set of eNBs used for a CoMP transmission scheme. The JP scheme is further divided into joint transmission and dynamic cell selection.

Joint transmission is a technique of transmitting PDSCHs from a plurality of transmission points (a part or the whole of a CoMP cooperation unit) at one time. That is, a plurality of transmission points may simultaneously transmit data to a single UE. The joint transmission scheme can improve the quality of a received signal coherently or non-coherently and actively eliminate interference with other UEs.

Dynamic cell selection is a technique of transmitting PDSCHs from one transmission point (of a CoMP cooperation unit) at one time. That is, one transmission point transmits data to a single UE at a specific time point, while the other transmission points of the CoMP cooperation unit do not transmit data to the UE at the time point. A transmission point for transmitting data to the UE may be dynamically selected.

Meanwhile, in the CS/CB scheme, CoMP cooperation units may perform cooperative beamforming for data transmission to a single UE. While only a serving cell transmits data to the UE, user scheduling/beamforming may be determined through coordination among cells of the CoMP cooperation unit.

Uplink CoMP reception refers to reception of an uplink signal through cooperation among a plurality of geographically separate transmission points. Uplink CoMP schemes include Joint Reception (JR) and Coordinated Scheduling/Beamforming (CS/CB).

In JR, a plurality of reception points receives a signal transmitted through a PUSCH. In CS/CB, while only one transmission point receives a PUSCH, user scheduling/beamforming is determined through coordination among cells of a CoMP cooperation unit.

In this CoMP system, multi-cell eNBs can commonly support data for a UE. In addition, the eNBs simultaneously support one or more UEs using the same radio frequency resources, thereby increasing system performance. The eNBs may also operate in Space Division Multiple Access (SDMA) based on CSI between a UE and the eNBs.

A serving eNB and one or more cooperative eNBs are connected to a scheduler through a backbone network in the CoMP system. The scheduler may receive channel information about the channel states between a UE and the cooperative eNBs, measured by each cooperative eNB and operate based on the channel information. For example, the scheduler may schedule information for cooperative MIMO for the serving eNB and the one or more cooperative eNBs. That is, the scheduler may directly command each eNB to perform the cooperative MIMO operation.

As described above, a CoMP system operates as a virtual MIMO system by grouping a plurality of cells into one group. Basically, the CoMP system adopts a MIMO communication scheme using multiple antennas.

Heterogeneous Deployment

Figure 6:
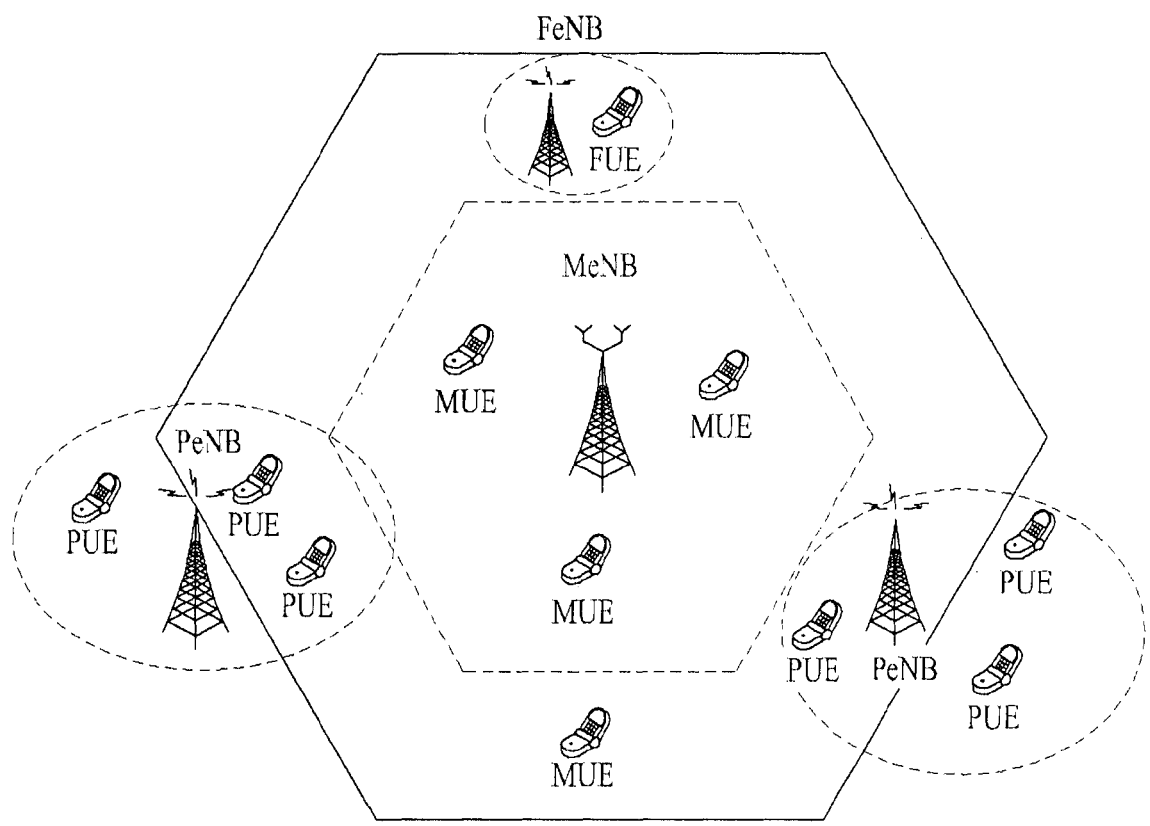
FIG. 6 is a view illustrating a heterogeneous network environment.

FIG. 6 illustrates a heterogeneous network wireless communication system including a macro eNB (MeNB) and a micro eNB (a Pico eNB (PeNB) or a Femto eNB (FeNB)). In this document, the term 'heterogeneous network' refers to a network in which an MeNB coexists with a micro eNB (PeNB or FeNB) even when the same Radio Access Technology (RAT) is used.

The MeNB is a general eNB having broad coverage and high transmit power in a wireless communication system. The MeNB may also be called a macrocell.

The micro eNB (PeNB or FeNB) may also be called, for example, a microcell, a picocell, a femtocell, a Home eNB (HeNB), a relay, etc. (the exemplary micro eNB and MeNB may be collectively referred to as transmission points). The micro eNB (PeNB or FeNB) is a small-sized version of the MeNB and can operate independently while performing most of the functions of the MeNB. The micro eNB (PeNB or FeNB) is overlaid in the coverage area of the MeNB or installed in a shadowing area beyond coverage of the MeNB. Compared to the MeNB, the micro eNB (PeNB or FeNB) may accommodate a small number of UEs with small coverage and low transmit power.

A UE may be served directly by the MeNB (such a UE is referred to as a Macro UE (MUE)) or by the micro eNB (PeNB or FeNB) (such a UE is referred to as a micro UE (a Pico UE (PUE) or Femto UE (FUE))). In any case, a PUE in the coverage of the PeNB may be served by the MeNB.

The micro eNBs may be classified into two types depending on whether access from a UE is restricted.

The first type is an eNB of an Open access Subscriber Group (OSG) or non-Closed access Subscriber Group (non-CSG), which allows access from an existing MUE or from a micro UE of a micro eNB. The existing MUE etc. may perform handover to an OSG eNB.

The second type is a CSG eNB. The CSG eNB does not allow access from an existing MUE or a micro UE of a micro eNB. Thus, a UE cannot perform handover to a CSG eNB.

Inter-Cell Interference Coordination (ICIC), Enhanced ICIC

In a heterogeneous network environment and/or a CoMP environment, interference between neighbor cells may occur. ICIC may be adopted to solve such an intercell interference problem.

As exemplary ICIC for a frequency resource, the 3GPP LTE Release-8 system defines a scheme for dividing an overall frequency region (e.g. system bandwidth) into one or more sub-regions (e.g. in units of Physical Resource Blocks (PRBs)) and exchanging ICIC messages between cells in individual frequency sub-regions. For example, Relative Narrowband Transmit Power (RNTP) related to downlink transmit power, uplink Interference Overhead Indication (IOI) related to uplink interference, and uplink High Interference Indication (HII) are defined as information included in the ICIC messages for frequency resources.

RNTP is information indicating downlink transmit power that a cell transmitting an ICIC message uses in a specific frequency sub-region. For example, if an RNTP field for a specific frequency sub-region is set to a first value (for example, 0), this means that downlink transmit power of the corresponding cell does not exceed a predetermined threshold value in the corresponding frequency sub-region. Meanwhile, if the RNTP field for the specific frequency sub-region is set to a second value (for example, 1), this means that the corresponding cell cannot promise downlink transmit power in the corresponding frequency sub-region. In other words, while the RNTP field set to 0 can be regarded as low downlink transmit power of the corresponding cell in the corresponding frequency sub-region, the RNTP field set to 1 cannot be regarded as low downlink transmit power of the corresponding cell in the corresponding frequency sub-region.

Uplink IOI is information indicating the amount of uplink interference that a cell transmitting an ICIC message experiences (or undergoes) in a specific frequency sub-region. For example, if an IOI field for a specific frequency sub-region is set to a value corresponding to the amount of high interference, this means that the corresponding cell experiences high uplink interference in the corresponding frequency sub-region. In the frequency sub-region corresponding to IOI indicating high uplink interference, a cell receiving the ICIC message may schedule a UE that uses low uplink transmit power from among UEs served thereby. Therefore, since UEs perform uplink transmission at low transmit power in the frequency sub-region corresponding to IOI indicating high uplink interference, uplink interference experienced by a neighbor cell (i.e. a cell transmitting the ICIC message) may be reduced.

Uplink HII indicates the degree of interference (or uplink interference sensitivity) that may be generated in the corresponding frequency sub-region due to uplink transmission in a cell transmitting the ICIC message. For example, if an HII field is set to a first value (e.g. 1) in a specific frequency sub-region, this may mean that the cell transmitting the ICIC message has a possibility of scheduling a UE of high uplink transmit power in the corresponding frequency sub-region. On the other hand, if the HII field is set to a second value (e.g. 0) in a specific frequency sub-region, this may mean that the cell transmitting the ICIC message has a possibility of scheduling a UE of low uplink transmit power in the corresponding frequency sub-region. Meanwhile, a cell receiving the ICIC message schedules a UE first in a frequency sub-region in which HII is set to the second value (e.g. 0) and schedules UEs capable of operating well even under high interference in another frequency sub-region in which HII is set to the first value (e.g. 1), thereby avoiding interference from another cell transmitting the ICIC message.

On the other hand, as exemplary ICIC for a time resource, the 3GPP LTE-A (or 3GPP LTE Release-10) system defines a scheme for dividing an overall time region into one or more sub-regions (e.g. in units of subframes) in the frequency domain and exchanging information indicating silencing or non-silencing between cells in individual time sub-regions. The cell transmitting the ICIC message may transmit information indicating that silencing is performed in a specific subframe to neighbor cells and does not schedule a PDSCH and a PUSCH in the corresponding subframe. On the other hand, the cell receiving the ICIC message may schedule uplink transmission and/or downlink transmission for a UE in a subframe in which silencing is performed in the cell transmitting the ICIC message.

Silencing may refer to an operation through which a specific cell does not perform most of signal transmission (or transmission is performed at no power or low power) on uplink or downlink in a specific subframe. As an example for a silencing operation, a specific cell may configure a specific subframe as a Multicast Broadcast Single Frequency Network (MBSFN) subframe. In a downlink subframe configured as the MBSFN subframe, signals are transmitted only in a control region and no signals are transmitted in a data region. As another example for a silencing operation, a cell generating interference may configure a specific subframe as an Almost Blank Subframe (ABS) or an ABS-with-MBSFN.

In a downlink subframe configured as the ABS, only a CRS is transmitted in a control region and a data region and the other control information and data are not transmitted (or transmission only at low power is possible). Notably, downlink channels and downlink signals such as a Physical Broadcast Channel (PBCH), a Primary Synchronous Signal (PSS), and a Secondary Synchronous Signal (SSS) may be transmitted even in the ABS. The ABS-with-MBSFN refers to a subframe in which even the CRS of the data region is not transmitted in the above-described ABS. Thus, silencing may be performed on a subframe basis and information indicating whether silencing is performed may be referred to as a silent subframe pattern.

Figure 7:
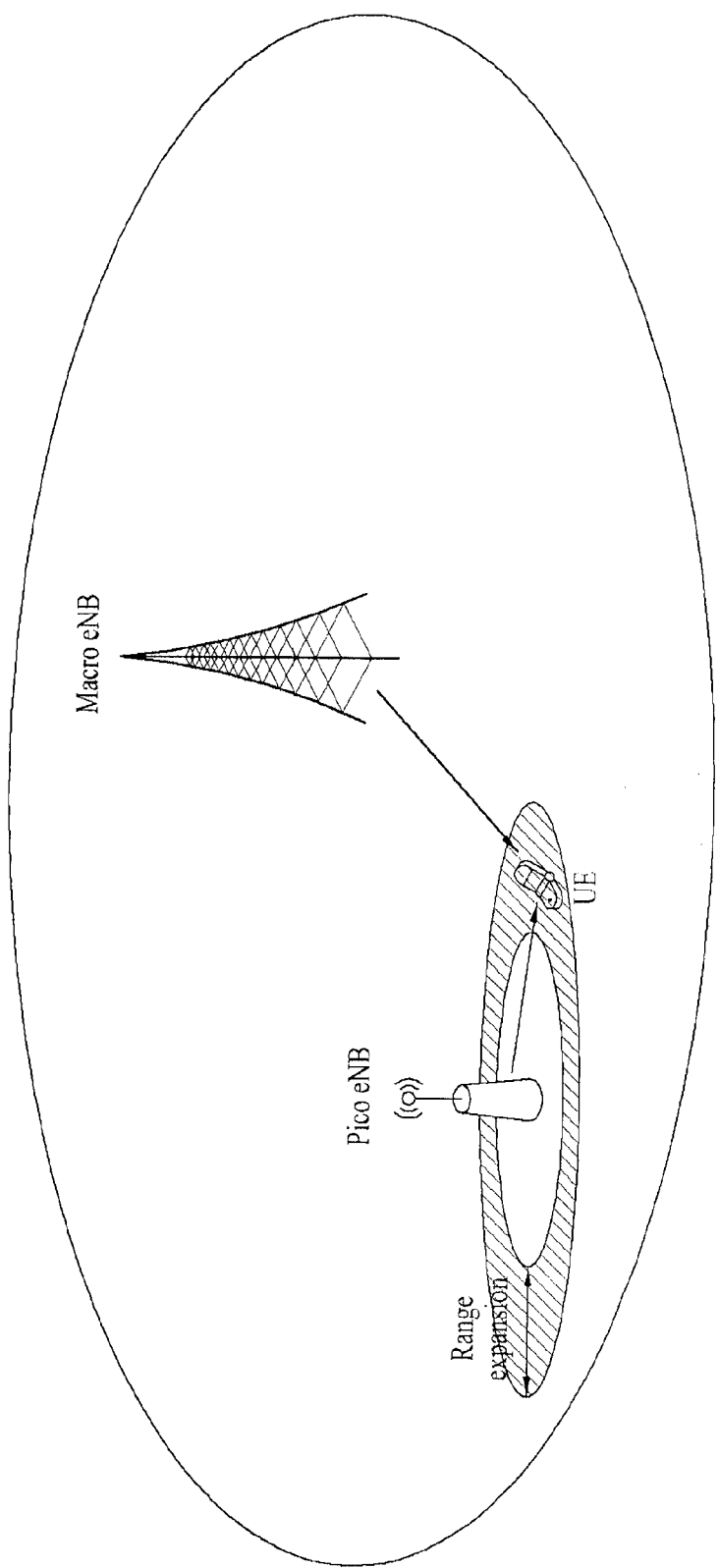
FIG. 7 is a view referred to describing cell range expansion.

FIG. 7 illustrates Cell Range Expansion (CRE). Referring to FIG. 7, an MeNB and a PeNB are shown. The CRE refers to coverage expansion of the PeNB as a result of handover to the PeNB by UEs that are subjected to interference from the PeNB in the vicinity of the coverage of the PeNB among UEs connected to the MeNB. The CRE results in distribution/load balancing and reduction of the effect of interference.

For CRE, a UE should perform a cell acquisition procedure in the PeNB. Generally, since the transmit power of the MeNB is higher than that of the PeNB, the UE may not obtain a PBCH, a PSS/SSS, etc. of the PeNB. Although the above-described ABS may be applied in order to reduce interference from the MeNB after the CRE is performed, this is ineffective in the cell acquisition procedure. This is because a PBCH and PSS/SSS of the MeNB may be transmitted for existing UEs even in the ABS as described earlier and the PBCH and PSS/SSS of the MeNB may generate high interference with the PBCH and PSS/SSS of the PeNB. Accordingly, as illustrated in FIG. 8, subframes/slot indexes of transmission points (MeNB and PeNB) may be differently configured for the CRE.

Figure 8:
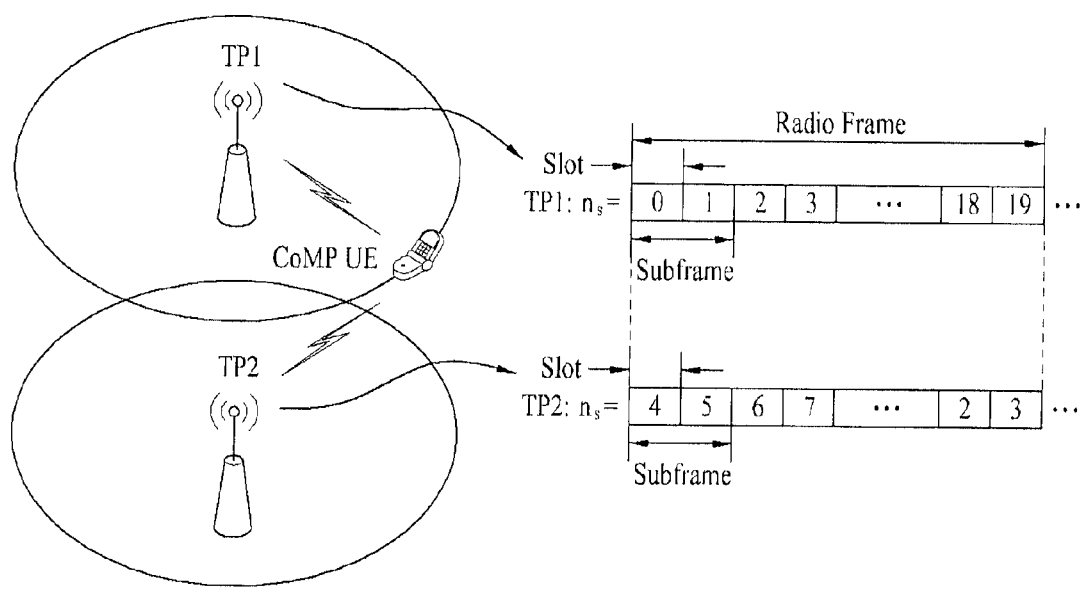
FIGS. 8 to 10 are views referred to for describing an embodiment of the present invention.

FIG. 8 illustrates configuration of different frame timings, i.e. different subframes/slot indexes, of transmission points in a CoMP environment. Referring to FIG. 8 in association with FIG. 7, CRE may be performed without any problem because different subframes/slot indexes are configured and signals can be smoothly received from the PeNB by applying the ABS after CRE is performed. Nonetheless, a problem may occur in the case where two transmission points perform cooperative transmission. More specifically, as an example of joint transmission of PDSCHs, if a first transmission point and a second transmission point simultaneously transmit data to a UE, the UE receiving the data will have to estimate channels by demodulating DMRSs for decoding. To demodulate the DMRSs, the UE should generate RS sequences based on cell identifiers (IDs) and slot numbers $n_s$. However, the UE cannot correctly demodulate the DMRSs from the PDSCHs transmitted from the respective transmission points due to different subframes/slot numbers of the two transmission points.

As described in the above example, it may be difficult to smoothly perform CoMP when frame timings of transmission points are differently configured in a CoMP environment.

Accordingly, the present invention proposes allocation of an offset value of each subframe/slot index per transmission channel to a UE, when cooperative communication is performed between multiple cells in the case where start time points of radio frames in cells are differently set (e.g. the case where a start subframe/slot index of a radio frame of a cell A has a value of 0 and a start subframe/slot index of a radio frame of a cell B has a value other than 0) in a CoMP environment.

In more detail, a UE acquires a frame timing of a serving cell based on detection of a PSS/SSS transmitted from a serving cell during initial synchronization acquisition in the legacy LTE/LTE-A system. The UE determines a reception subframe/slot index from the acquired frame timing and determines a scrambling sequence used for a CRS according to a slot index and an OFDM symbol index, thereby estimating the CRS. The UE decodes a PBCH and a System Information Block (SIB) using the CRS to obtain system information including system timing information of the serving cell. The acquired CRS frame timing (reference frame timing) is commonly used for all communication channels.

According to an embodiment of the present invention, a virtual frame timing may be independently configured according to each channel, as distinct from the reference frame timing. Further, a virtual cell ID may be configured along with the virtual frame timing. The virtual frame timing may be transmitted to the UE as a subframe/slot offset with the reference frame timing of a cell/transmission point.

Channels on which the virtual frame timing/virtual cell ID can be independently configured may include downlink and uplink channels, data and control channels, and first and second data channels. For example, the virtual frame timing/virtual cell ID may be independently configured on each of the uplink and downlink channels.

Alternatively, channels on which the virtual frame timing/virtual cell ID can be independently configured may be interpreted as including a CSI-RS transmitted for channel measurement between a transmission point and a UE on downlink, a PDSCH for downlink data transmission, a PDCCH and an Enhanced PDCCH (EPDCCH) for downlink control signal transmission, a PUSCH for uplink data transmission, a PUCCH for uplink control signal transmission, and an SRS for uplink channel measurement. In other words, the virtual frame timing/virtual cell ID may be independently configured with respect to the CSI-RS, PDSCH, PDCCH, EPDCCH, PUSCH, PUCCH, and SRS. Notably, these examples are purely exemplary and, according to necessity, only a part of the above channels (more precisely, channels or signals) may be used for configuring the virtual frame timing/virtual cell ID. Hereinafter, a CoMP environment to which the above description is applied will be explained with reference to FIG. 9.

Figure 9:
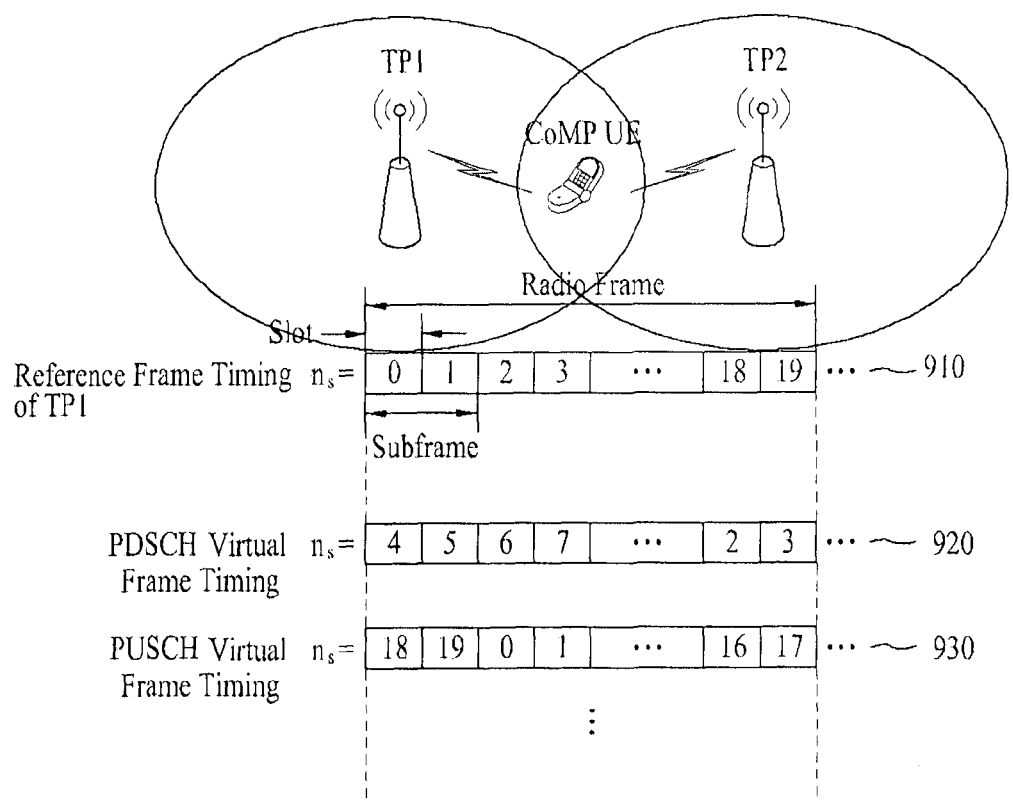

FIG. 9 is a view referred to for describing a virtual frame timing/virtual cell ID and operation of transmission points and a UE associated with the virtual frame timing/virtual cell ID according to an embodiment of the present invention. Referring to FIG. 9, a CoMP environment is illustrated in which a first transmission point, TP1 (a serving cell) and a second transmission point, TP2 perform cooperative transmission to a CoMP UE. The transmission point may be understood as a cell, an eNB, a sector, a Remote Radio Head (RRH), a relay, etc. and may be a comprehensive term applied to a specific component carrier at a specific transmission point. Although the two transmission points are shown as an example, the present invention is applicable to three or more transmission points having different frame timings.

Referring back to FIG. 9, a virtual frame timing 920 for a PDSCH, which precedes a reference frame timing of the first transmission point by four slots, and a virtual frame timing 930 for a PUSCH, which is later than the reference frame timing of the first transmission point by two slots, may be configured.

The transmission points performing CoMP transmit the PDSCH generated based on the virtual frame timing/virtual cell ID for the PDSCH and transmit the PUSCH generated based on the virtual frame timing/virtual cell ID for the PUSCH. The UE may decode a corresponding channel based on a virtual frame timing/virtual cell ID for each channel.

The Operation of the UE will be described in more detail. The UE may receive offset information between a virtual frame timing configured independently for each channel and a reference frame timing of a corresponding transmission point through higher layer signaling. For example, in FIG. 9, the UE may receive an offset value 4 between the virtual frame timing for PDSCH and the reference frame timing of the first transmission point and an offset value 18 between the virtual frame timing for PUSCH and the reference frame timing of the second transmission point.

The UE can be aware of the virtual frame timing for each channel from the received offset value. In other words, the UE can discern a starting point of a virtual radio frame and a virtual subframe/slot index for each channel from the offset value.

Next, upon receiving each channel, the UE may use the virtual frame timing and/or virtual cell ID in decoding a channel to which the virtual frame timing has been applied. That is, upon determining a parameter for generating a corresponding channel signal, the UE may use a corresponding virtual subframe/slot index. Likewise, during uplink transmission, the UE may use a corresponding virtual subframe/slot index when determining a parameter for generating an uplink channel signal to be transmitted using a virtual frame timing and/or virtual cell ID according to the uplink transmission channel.

Figure 10:
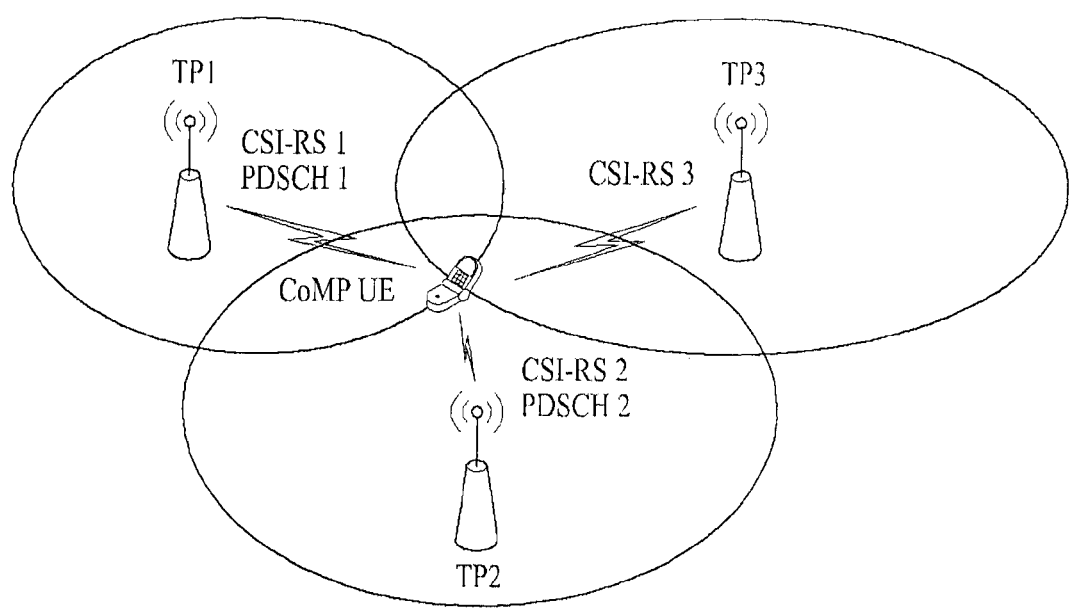

According to the present invention as described above, the aforementioned problems which may be generated when frame timings of transmission points are differently configured in a CoMP environment can be solved. In addition, CoMP can be more efficiently supported by independently configuring the virtual frame timing with respect to each channel. Referring to FIG. 10 for example, first to third transmission points may respectively transmit CSI-RSs, CSI-RS1 to CSI-RS3 for interference measurement of a CoMP UE. In this situation, the third transmission point transmits CSI-RS3 for interference measurement of the CoMP UE but may not participate in cooperative transmission of a PDSCH. In addition, when a heterogeneous network environment is considered, a cooperative transmission point for a PDSCH may differ from a cooperative reception point for a PUSCH because PDSCH coverage is different from PUSCH coverage due to a difference in transmit power between eNBs. That is, CoMP sets for respective channels may differ. In this case, if the virtual frame timing is identically applied, overhead may occur in terms of complexity and signaling for other channels which have no relation to cooperative transmission. To identically apply the virtual frame timing even when optimal CoMP sets for respective channels differ, a CoMP set including all transmission/reception points in the optimal CoMP set for each channel should be configured so that the size of the CoMP set increases and signaling overhead and complexity of the UE increase.

Accordingly, more efficient operation may be performed by applying the virtual frame timing for each channel as in the present invention.

Hereinafter, the case where the above-described principle of the present invention is applied to each channel will be described.

When each transmission point transmits a CSI-RS in cooperative transmission, the case is considered where the transmission point informs a UE of information about transmission of a plurality of CSI-RSs and the UE estimates channel information between each transmission point and the UE through measurement of received CSI-RSs and feeds back the estimated channel information. At this time, according to the present invention, upon transmitting transmission configuration information about N CSI-RS_n (where n=1, . . . , N) to the UE, each transmission point informs the UE of a virtual cell ID and a subframe/slot offset value between a virtual frame timing of each CSI-RS and a reference frame timing.

For example, when a slot offset of an n-th CSI-RS is set to D_n so that a virtual frame timing of CSI-RS_n is started earlier than a reference frame timing by D_n slots and when a reference slot index induced from a transmission CRS of a serving cell is n_s (where n_s=0, . . . , 19), a virtual slot index for CSI-RS_n becomes (n_s+D_n)mod 20. A transmission time point and a scrambling sequence of CSI-RS_n are determined by the virtual cell ID and virtual subframe/slot index for CSI-RS_n. Namely, in Equation 1 and Equation 2, a virtual slot index $n_s^{CSI\text{-}RS\_n}$ may be used instead of $n_s$.

$$c_{init}=2^{10}\cdot(7\cdot(n_s+1)+l+1)\cdot(2\cdot n_{ID}+1)+2\cdot n_{ID}+N_{CP} \quad \text{[Equation 1]}$$

In Equation 1, c(i) denotes a pseudo-random sequence necessary for generating a reference signal sequence of a CSI-RS, $n_s$ denotes a slot index, $n_{ID}$ denotes a value of a cell ID unless indicated otherwise by higher layer signaling, and $N_{CP}$ has a value of 1 in the case of a normal CP and a value of 0 in the case of an extended CP.

$$(10n_f+\lfloor n_s/2 \rfloor - \Delta_{CSI\text{-}RS}) \bmod T_{CSI\text{-}RS}=0 \quad \text{[Equation 2]}$$

Equation 2 shows a subframe in which a CSI-RS is transmitted, $T_{CSI\text{-}RS}$ denotes a period during which the CSI-RS is transmitted, $\Delta_{CSI\text{-}RS}$ denotes an offset value, $n_f$ denotes a system frame number, and $n_s$ denotes a slot number.

In cooperative transmission, if the UE receives downlink data through a DMRS based PDSCH from a cooperative cell other than a serving cell, a transmission point may inform the UE of a virtual ID and a subframe/slot offset value between a virtual frame timing for the PDSCH and a reference frame timing upon transmitting DMRS based PDSCH transmission configuration information, according to the present invention. The UE may determine a DMRS scrambling sequence of the PDSCH by the virtual cell ID and the virtual subframe/slot index for the PDSCH. That is, when an initial value of the DMRS scrambling sequence is determined as indicated by the following Equation 3, a virtual slot index $n_s^{DMRS}$ may be used instead of $n_s$.

$$c_{init}=(\lfloor n_s/2 \rfloor+1)\cdot(2n_{ID}^{(nSCID)}+1)\cdot 2^{16}+n_{SCID} \quad \text{[Equation 3]}$$

In cooperative transmission, the case where the UE selectively receives downlink data through a DMRS based PDSCH from a serving cell and cooperative cells may be considered.

In this case, according to the present invention, upon transmitting PDSCH_n (where n=1, . . . , N) transmission configuration information based on N DMRSs to the UE, the transmission point informs the UE of a virtual cell ID and a subframe/slot offset value between a virtual frame timing of each PDSCH and a reference frame timing. Thus, the UE may determine a DMRS transmission scrambling sequence of an n-th PDSCH by a virtual subframe/slot index for each PDSCH.

The UE receives information as to which PDSCH in a corresponding subframe is transmitted from scheduling information of a PDCCH upon receiving a PDSCH and determines a DMRS scrambling sequence by applying a virtual cell ID and a virtual subframe/slot index of a corresponding PDSCH_n.

In cooperative transmission, the case where the UE transmits uplink data through a DMRS based PUSCH to a cooperative cell other than a serving cell may be considered. According to the present invention, upon transmitting PUSCH transmission configuration information to the UE, the transmission point informs the UE of a virtual cell ID and a subframe/slot offset value between a PUSCH virtual frame timing and a reference frame timing. The UE may determine a DMRS base sequence and DMRS cyclic shift hopping of the PUSCH by the virtual subframe/slot index for the PUSCH. More specifically, a DMRS related to PUCCH and PUSCH transmissions in the LTE/LTE-A system is generated by cyclic shift of a base sequence $\bar{r}_{u,v}(n)$. In the base sequence $\bar{r}_{u,v}(n)$, u denotes a sequence group number and v denotes a number in a group. In association with a sequence group, which group will be used among sequence groups in one cell may be fixed or may vary according to a slot and this is called group hopping. If group hopping is not applied, sequence hopping may be applied. If the length of a sequence is larger than 6 RBs, two sequences are present according to bandwidth. Which sequence will be used varies according to a slot and this is called sequence hopping. Group hopping and sequence hopping may refer to Equation 4 and Equation 5, respectively and a virtual slot index $n_s^{PUSCH}$ may be used instead of $n_s$.

$$u=(f_{gh}(n_s)+f_{ss}) \bmod 30 \quad \text{[Equation 4]}$$

In Equation 4, $f_{gh}(n_s)$ denotes a group hopping pattern and $f_{ss}$ denotes a sequence shift pattern.

$$v = \begin{cases} c(n_s) & \text{if group hopping is disabled and sequence hopping is enabled} \\ 0 & \text{otherwise} \end{cases} \quad \text{[Equation 5]}$$

In Equation 5, c(i) denotes a pseudo-random sequence.

When a transmission resource region of a PUSCH is frequency-hopped, the resource region may be determined by a virtual cell ID and a virtual subframe/slot index for the PUSCH.

As another application example of this scheme, the case where the UE selectively transmits downlink data through a DMRS based PUSCH to a serving cell and cooperative cells in cooperative transmission may be considered. According to the present invention, upon transmitting transmission configuration information about N PDSCH_n (where n=1, . . . , N) to the UE, the transmission point informs the UE of a virtual cell ID and a subframe/slot offset value between a virtual frame timing of each PUSCH and a reference frame timing. Thus, the UE may determine a DMRS base sequence of an n-th PUSCH and DMRS cyclic shift hopping by the virtual subframe/slot index for each PUSCH.

During PUSCH transmission, the UE receives information as to which PUSCH should be transmitted in a corresponding subframe from PDCCH scheduling information and determines the DMRS base sequence and DMRS cyclic shift hopping by applying a virtual subframe/slot index of a corresponding PUSCH_n.

If a PUSCH transmission resource region is frequency-hopped, the resource region may be determined by the virtual cell ID and the virtual subframe/slot index for an n-th PUSCH to be designated for transmission.

As still another application example of this scheme, the case where the UE transmits uplink control information through a PUCCH to cooperative cells other than a serving cell may be considered. According to the present invention, upon transmitting PUCCH transmission configuration information to the UE, the transmission point informs the UE of a virtual cell ID and a subframe/slot offset value between a PUCCH virtual frame timing and a reference frame timing and the UE may determine a PUCCH base sequence and PUCCH cyclic shift by the virtual cell ID and the virtual subframe/slot index for the PUCCH. In addition, the slot index by the virtual frame timing may be used for determining a PRB in which the PUCCH is transmitted.

As another application example of this scheme, the case where the UE transmits uplink channel measurement information to cooperative cells other than a serving cell through SRS transmission may be considered. According to the present invention, the transmission point informs the UE of a virtual cell ID and a subframe/slot offset between a virtual frame timing of corresponding SRS_n and a reference frame timing upon transmitting transmission configuration information of an n-th SRS. The UE may determine a transmission subframe, a base sequence, DMRS cyclic shift hopping, and/or a transmission band region for SRS_n by the virtual cell ID and virtual subframe/slot index for SRS_n.

In the case of the PDSCH and PUSCH, although the above description has been given based on the case where the DMRS and data are generated by commonly applying both the virtual subframe and the slot index, the virtual slot index and/or cell ID may be partially used to generate the DMRS and data.

For example, if the UE receives downlink data through the PDSCH, a specific parameter (e.g. DMRS scrambling sequence) for PDSCH generation is determined by a virtual subframe/slot index for the PDSCH but other partial parameters (e.g. data scrambling sequence) may be determined by a reference subframe/slot index.

Alternatively, when the UE transmits uplink data through the PUSCH, a specific parameter (e.g. DMRS base sequence and DMRS cyclic shift hopping) for PUSCH generation is determined by a virtual subframe/slot index for the PUSCH but other partial parameters (e.g. data scrambling sequence) may be determined by a reference subframe/slot index.

As another example of the present invention, a frame offset may be designated in addition to a subframe/slot offset value between a virtual frame timing and a reference frame timing of a channel during transmission of transmission configuration information of each communication channel so that a specific parameter for corresponding channel generation may be determined by a virtual subframe/slot index and a virtual frame index.

Figure 11:
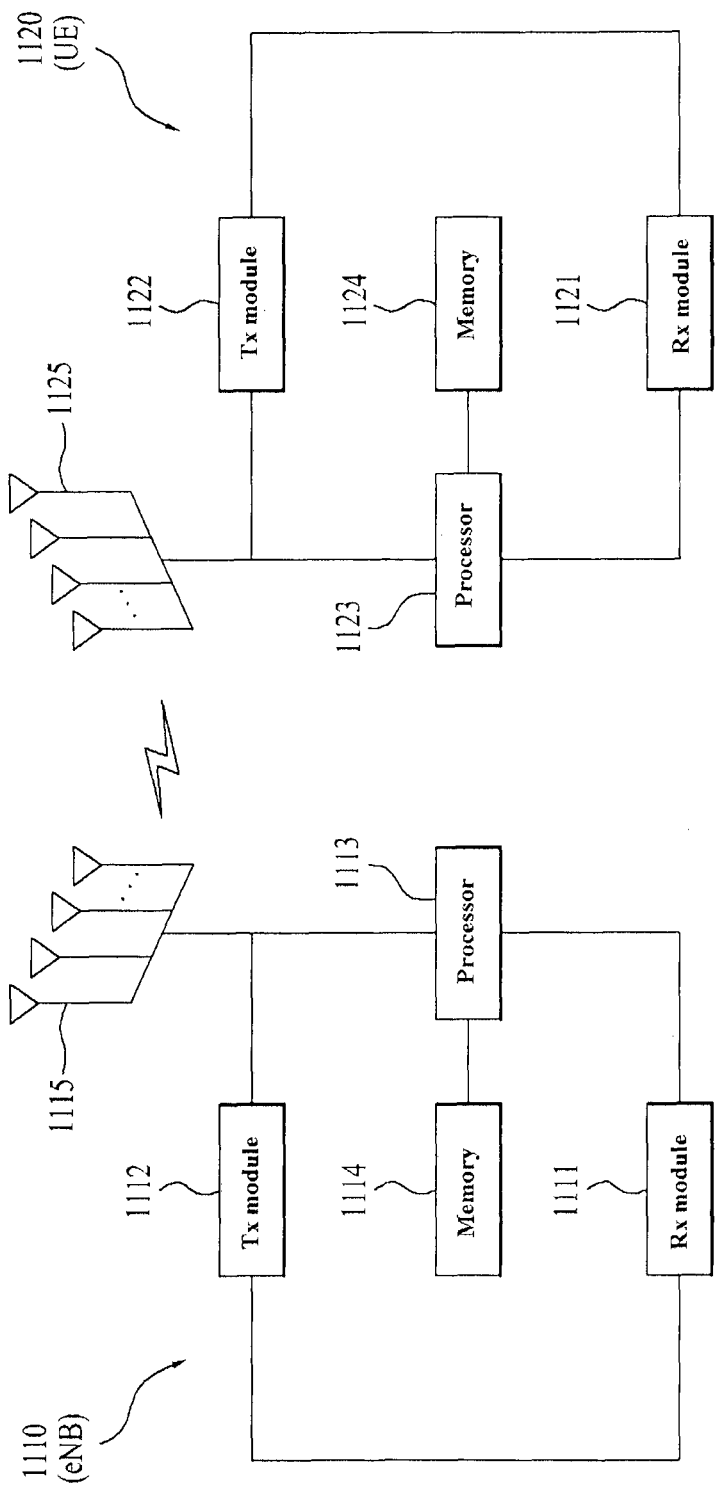
FIG. 11 is a view illustrating the configuration of a transmission apparatus and a reception apparatus.

FIG. 11 is a view illustrating the configuration of a transmission point and a UE according to an embodiment of the present invention.

Referring to FIG. 11, a transmission point 1110 according to the present invention may include a reception module 1111, a transmission module 1112, a processor 1113, a memory 1114, and a plurality of antennas 1115. The plurality of antennas 1115 is used to support MIMO transmission and reception. The reception module 1111 may receive uplink signals, data and information from a UE. The transmission module 1112 may transmit downlink signals, data and information to the UE. The processor 1113 may control overall operation of the transmission point 1110.

In accordance with an embodiment of the present invention, the processor 1113 of the transmission point 1110 may perform operations necessary for applying the afore-described embodiments.

The processor 1113 of the transmission point 1110 processes information received by the transmission point 1110 and information to be transmitted by the transmission point 1110. The memory 1114 may store the processed information for a predetermined time and may be replaced with a component such as a buffer (not shown).

Referring back to FIG. 11, a UE 1120 according to the present invention may include a reception module 1121, a transmission module 1122, a processor 1123, a memory 1124, and a plurality of antennas 1125. The plurality of antennas 1125 is used to support MIMO transmission and reception. The reception module 1121 may receive downlink signals, data and information from the transmission point. The transmission module 1122 may transmit uplink signals, data and information to the transmission point. The processor 1123 may control overall operation of the UE 1120.

In accordance with an embodiment of the present invention, the processor 1123 of the UE 1120 may process operations necessary for the afore-described embodiments.

The processor 1123 of the UE 1120 processes information received by the UE 1120 and information to be transmitted by the UE 1120. The memory 1124 may store the processed information for a predetermined time and may be replaced with a component such as a buffer (not shown).

One or more of the above-described embodiments of the present invention may apply to the configurations of the transmission point and the UE, independently or in combination. Repetitive descriptions are avoided for clarity.

In FIG. 11, the description of the transmission point 1110 may apply to a relay as a downlink transmission entity or an uplink reception entity and the description of the UE 1120 may apply to the relay as a downlink reception entity or an uplink transmission entity.

The embodiments of the present invention are applicable to various mobile communication systems.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. Therefore, the present invention is not intended to be limited to the embodiments disclosed herein but is to give a broadest range matching the principles and new features disclosed herein.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention is not intended to be limited to the embodiments disclosed herein but is to give a broadest range matching the principles and new features disclosed herein. It will be obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention can be applied to a variety of mobile communication systems.

The invention claimed is:

1. A method for transmitting, at a user equipment, an uplink signal to a transmission point (TP) performing cooperative transmission in a wireless communication system, comprising:
acquiring a reference frame timing of the TP based on a synchronous signal transmitted from the TP;
receiving information of a virtual frame timing for a specific uplink (UL) channel, the virtual frame timing having a specific time offset with the reference frame timing; and
generating the specific UL channel by using the virtual frame timing,
wherein the virtual frame timing is differently configured according to a type of the specific UL channel.

2. The method according to claim 1,
wherein a scrambling sequence used for a Cell-specific Reference Signal (CRS) is determined by using the reference frame timing, and
wherein at least one of a plurality of parameters for the specific UL channel is determined by using the virtual frame timing.

3. The method according to claim 2,
wherein the specific UL channel is Physical Uplink Shared CHannel (PUSCH), and
wherein at least one of a DeModulation Reference Signal (DMRS) base sequence and a DMRS cyclic shift hopping for the PUSCH is determined by using the virtual frame timing, and a data scrambling sequence for the PUSCH is determined by using the reference frame timing.

4. The method according to claim 1, wherein the type of the specific UL channel is one of the PUSCH, Physical Uplink Control CHannel (PUCCH), and Sounding Reference Signal (SRS).

5. The method according to claim 1, wherein the virtual frame timing precedes the reference frame timing by the specific time offset.

6. The method according to claim 1, wherein the virtual frame timing is later than the reference frame timing by the specific time offset.

7. A method for receiving, at a user equipment, a downlink signal from a transmission point (TP) performing cooperative transmission in a wireless communication system, comprising:
acquiring a reference frame timing of the TP based on a synchronous signal transmitted from the TP;
receiving information of a virtual frame timing for a specific downlink (DL) channel, the virtual frame timing having a specific time offset with the reference frame timing; and
receiving and decoding the specific DL channel by using the virtual frame timing,
wherein the virtual frame timing is differently configured according to a type of the specific DL channel.

8. The method according to claim 7,
wherein a scrambling sequence used for a Cell-specific Reference Signal (CRS) is determined by using the reference frame timing, and
wherein at least one of a plurality of parameters for the specific DL channel is determined by using the virtual frame timing.

9. The method according to claim 8,
wherein the specific DL channel is Physical Downlink Shared CHannel (PDSCH), and
wherein a DeModulation Reference Signal (DMRS) scrambling sequence for the PDSCH is determined by using the virtual frame timing, and a data scrambling sequence for the PDSCH is determined by using the reference frame timing.

10. The method according to claim 7, wherein the type of the specific DL channel is one of the PDSCH, Channel State Information-Reference Signal (CSI-RS), Physical Downlink Control CHannel (PDCCH), and Enhanced PDCCH (EPDCCH).

11. The method according to claim 7, wherein the virtual frame timing precedes the reference frame timing by the specific time offset.

12. The method according to claim 7, wherein the virtual frame timing is later than the reference frame timing by the specific time offset.

13. A user equipment for transmitting an uplink signal to a transmission point (TP) performing cooperative transmission in a wireless communication system, comprising:
a Radio Frequency (RF) module; and
a processor configured to control the RF module,
wherein the processor is configured to
acquire a reference frame timing of the TP based on a synchronous signal transmitted from the TP,
receive information of a virtual frame timing for a specific uplink (UL) channel, the virtual frame timing having a specific time offset with the reference frame timing, and
generate the specific UL channel by using the virtual frame timing,
wherein the virtual frame timing is differently configured according to a type of the specific UL channel.

14. A user equipment for receiving a downlink signal from a transmission point (TP) performing cooperative transmission in a wireless communication system, comprising:
a Radio Frequency (RF) module; and
a processor configured to control the RF module,
wherein the processor is configured to
acquire a reference frame timing of the TP based on a synchronous signal transmitted from the TP,
receive information of a virtual frame timing for an specific downlink (DL) channel, the virtual frame timing having a specific time offset with the reference frame timing, and
receive and decode the specific DL channel by using the virtual frame timing,
wherein the virtual frame timing is differently configured according to a type of the specific DL channel.

* * * * *